(12) United States Patent
Ozaki (10) Patent No.: US 8,776,994 B2
(45) Date of Patent: *Jul. 15, 2014

(54) CHAIN CONVEYOR SYSTEM

(75) Inventor: Hajime Ozaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 73 days.

This patent is subject to a terminal disclaimer.

(21) Appl. No.: 13/477,156

(22) Filed: May 22, 2012

(65) Prior Publication Data

US 2012/0305368 A1   Dec. 6, 2012

(30) Foreign Application Priority Data

Jun. 6, 2011   (JP) .................................. 2011-126593

(51) Int. Cl.
*B65G 23/18*   (2006.01)
(52) U.S. Cl.
CPC ...................................... *B65G 23/18* (2013.01)
USPC ...................................... 198/805; 198/690.1
(58) Field of Classification Search
USPC ............ 198/805, 690.1, 472.1, 850–853, 619
See application file for complete search history.

(56) References Cited

U.S. PATENT DOCUMENTS

| | | | | |
|---|---|---|---|---|
| 3,497,056 A | * | 2/1970 | Clark | 198/805 |
| 4,067,438 A | * | 1/1978 | Spurr et al. | 198/805 |
| 4,586,601 A | * | 5/1986 | Hodlewsky | 198/690.1 |
| 8,434,613 B2 | * | 5/2013 | Ozaki | 198/853 |
| 2012/0073938 A1 | * | 3/2012 | Ozaki et al. | 198/690.1 |

FOREIGN PATENT DOCUMENTS

JP   09-027511   1/1997

* cited by examiner

*Primary Examiner* — William R Harp
(74) *Attorney, Agent, or Firm* — Stephen H. Eland; Dann, Dorfman, Herrell & Skillman (57) ABSTRACT

For a chain conveyor system having a main conveyor having links with an inclined or a slippery wet conveying run extending from a feed end to a discharge end capable of securely attracting and retaining metallic magnetic articles on the run by article-attracting magnet pieces in selected links for attracting and retaining the articles on the run. An auxiliary conveyor for enabling separation of the articles from the conveyor at the discharge end of the run by releasing attraction of the articles. The auxiliary conveyor has links which register with the main conveyor links at the discharge end of the main conveyor system. The registering links of the auxiliary conveyor have article-separating elements operable to reduce the magnetic force of the magnet pieces at the discharge end of the run to enable separation of the conveyed articles from the main conveyor.

11 Claims, 9 Drawing Sheets

CHAIN CONVEYOR SYSTEM

CROSS REFERENCE TO RELATED APPLICATIONS

This application claims the foreign priority benefit under Title 35, United States Code, §119(a)-(d) of Japanese Patent Application No. 2011-126593, filed on Jun. 6, 2011 in the Japan Patent Office, the disclosure of which is herein incorporated by reference in its entirety.

BACKGROUND OF THE INVENTION

1. Field of the Invention

The present invention relates to a chain conveyor system for loading and conveying articles to be conveyed (referred to simply as articles hereinafter) and more specifically to a chain conveyor system for conveying metallic magnetic articles by securely attracting and retaining the articles even on such a conveyor line inclined upward or downward or on a slippery wet conveyor line.

2. Related Art

Conventionally, there has been known a chain conveyor system for conveying magnetically attractive articles so as not fall by using a magnet-backed chain having a large number of attractive magnet units disposed at certain intervals on an outer circumferential side of a chain base. In each attractive magnet unit, a surface of permanent magnet fixed to a thin ferromagnetic yoke is coated by epoxy resin and the like as disclosed in Japanese Patent Application Laid-open No. Hei.9-27511 (Paragraph 8, FIG. 8) for example.

However, because the large number of attractive magnet units is disposed on the outer circumferential side of the chain base in the prior art chain conveyor system using the magnet-backed chain, there have been problems that not only do the attractive magnet units come in contact directly with the metallic magnetic articles, thus displacing or damaging the permanent magnets, but also the chain conveyor system generates noise due to the contact or impact by the articles on the magnet units.

Still more, because the attractive magnet units continue to be directly in contact with the metallic magnetic articles and to exhibit their strong attractive force even in a terminal discharge area of the conveying run of the prior art chain conveyor system, it often has been difficult to release or separate the articles, posing a serious hindrance in transferring the articles, due to the strong attractive force of the attractive magnet units in transferring the articles to a succeeding conveyor line.

There has been also another problem that it becomes difficult to remove the articles for sampling against the strong attractive force of the attractive magnet unit when it is desired to sample the articles in an inclined straight conveying area between the feed end and the terminal discharge end of the conveyor run, thus increasing a burden when sampling the articles within the inclined straight conveying area.

SUMMARY OF THE INVENTION

Accordingly, the present invention aims at solving the aforementioned prior art problems by providing a chain conveyor system that avoids damages and vibration noise otherwise generated by impacts by securely attracting and retaining metallic magnetic articles in inclined conveyor lines or slippery wet conveyor lines and permits to readily separate the articles from the conveyor line by releasing the attraction of the article-at specific position of the conveyor line.

In order to solve the aforementioned problems, according to a first aspect of the invention, there is provided a chain conveyor system comprising:

a conveyor chain that comprises a plurality of synthetic resin link modules each having a conveying surface and link pins that link the synthetic resin link modules with each other in a chain longitudinal direction and that conveys articles by attracting and retaining the articles on the conveying surfaces thereof by magnetism;

sprockets that engage with and turn the conveyor chain; and article-separating means disposed on an inner circumferential surface of the conveyor chain to separate the articles attracted to the synthetic resin link modules;

the conveyor chain further comprising:

magnet-piece-accommodating chambers formed respectively within the synthetic resin link modules; and article-attracting magnet pieces that are accommodated respectively within the magnet-piece-accommodating chambers and that move from a chain inner circumferential side to a chain outer circumferential side within the magnet-piece-accommodating chambers to attract and retain the article on the conveying surface; and the article-separating means comprises article-separating magnet pieces that attract the article-attracting magnet pieces within the magnet-piece-accommodating chambers from the chain outer circumferential side to the chain inner circumferential side within the magnet-piece-accommodating chambers to separate the attraction with the articles; and the article-separating means extends to a conveying area of the conveyor chain.

According to a second aspect of the invention, the article-separating means is assembled to a rotary shaft of the sprocket and extends from the terminal discharge area to a preceding straight discharge area of the conveyor chain.

According to a third aspect of the invention, the article-separating magnet pieces are disposed respectively so as to face to the article-attracting magnet pieces.

According to a fourth aspect of the invention, an attractive force of the article-separating magnet piece to the article-attracting magnet piece is set to be greater than an attractive force of the article-attracting magnet piece to the article.

According to a fifth aspect of the invention, the article-separating means comprises an auxiliary conveyor having a pair of article-separating sprockets disposed on the chain inner circumferential surface separately along the chain longitudinal direction between the terminal discharge area and the straight conveying area; and an article-separating chain wrapped around the pair of article-separating sprockets and around which article-separating magnet pieces are provided.

According to a sixth aspect of the invention, one article-separating sprocket among the pair of article-separating sprockets is supported rotably on a rotary shaft coaxial with the sprocket that turns the conveyor chain through an intermediary of a bearing.

According to a seventh aspect of the invention, one article-separating sprocket among the pair of article-separating sprockets is fixed to the rotary shaft of the sprocket that turns the conveyor chain through a key that fits into a key groove formed on the rotary shaft.

According to an eighth aspect of the invention, the article-attracting magnet pieces and the article-separating magnetic pieces are elongated in the conveyor width direction within the conveyor chain.

Advantageous Effects of the Invention

According to the first aspect of the chain conveyor system of the invention, because the chain conveyor system comprises the conveyor chain having the plurality of synthetic resin link modules each having the conveying surface and the link pins for linking the synthetic resin link modules with each other in the chain longitudinal direction and the sprockets that engage with and turn the conveyor chain, the synthetic resin link modules of the conveyor chain synergistically exhibit attractive force and impact absorbing force and absorb impacts and vibrations of the metallic magnetic articles that are otherwise liable to be generated during conveyance of the articles. Therefore, it is possible not only to convey the articles by securely attracting and retaining the articles even on a conveyor line inclined upward or downward or on a slippery wet conveyor line, but also to avoid damages and vibration noise which would otherwise be generated by impacts of the metallic magnetic articles.

Because the conveyor chain further comprises the magnet-piece-accommodating chambers formed within the synthetic resin link modules and the article-attracting magnet pieces that are accommodated respectively within the magnet-piece-accommodating chambers and that move from the chain inner circumferential side to the chain outer circumferential side within the magnet-piece-accommodating chambers to attract and retain the articles on the conveying surfaces and because the article-separating means disposed on the inner circumferential surface of the conveyor chain for separating the articles attracted to the synthetic link modules comprises the article-separating magnet pieces that separate the articles attracted to the synthetic resin link modules by attracting the article-attracting magnet pieces within the magnet-piece-accommodating chambers from the chain outer circumferential side to the chain inner circumferential side within the magnet-piece-accommodating chambers, the article-attracting magnet pieces move between the chain outer circumferential side where the article-attracting magnet pieces attract the metallic magnetic articles and the chain inner circumferential side where the article-separating magnet pieces attract the article-separating magnet pieces within the magnet-piece-accommodating chambers and thus forcibly attract and separate the articles. Accordingly, it is possible to arbitrarily switch the article-attracting and non-attracting states.

Furthermore, because the article-separating means extends to the conveying area of the conveyor chain, the article-separating magnet pieces can release the attraction between the articles and the article-attracting magnet pieces sequentially within the conveying area. Therefore, the chain conveyor system can smoothly release the attraction of the articles in tranferring the articles to a succeeding conveyor line or in sampling the articles by enlarging a range for forcibly separating the article-attracting magnet pieces from the articles as necessary to separate the articles.

According to the second aspect of the chain conveyor system of the invention, because the article-separating means is assembled to the rotary shaft of the sprocket that turns the conveyor chain and extends from the terminal discharge area to the preceding straight discharge area of the conveyor chain, the article-separating magnet pieces can release the attraction between the articles and the article-attracting magnet pieces sequentially between the terminal discharge area and the preceding straight discharge area corresponding to engagement and disengagement states of the conveyor chain and the sprocket.

Therefore, it is possible to enlarge the range where the article-attracting magnet pieces are forcibly separated from the articles as necessary to separate the articles, to securely avoid the articles from being unintentionally attracted in the terminal discharge area and to securely transfer the articles to the succeeding conveyor line and the like, as compared to a case when the article-separating means is provided coaxially with the sprocket, i.e., only in the terminal discharge area of the conveyor chain.

According to the third aspect of the chain conveyor system of the invention, because the article-separating magnet pieces of the article-separating means are disposed respectively so as to face to the article-attracting magnet pieces of the synthetic resin link modules and the article-separating magnet pieces of the article-separating means and the article-attracting magnet pieces of the synthetic resin link modules face orderly with each other and attract with each other, it is possible to smoothly transfer the articles by exhibiting both attractive forces in maximum and steadily in separating the articles without causing any phase shift in separation timing of the article-separating means.

According to the fourth aspect of the chain conveyor system of the invention, because the attractive force of the article-separating magnet piece to the article-attracting magnet piece is set to be greater than the attractive force of the article-attracting magnet piece to the article, the attraction between the article-separating magnet piece of the article-separating means and the article-attracting magnet piece of the synthetic resin link module is powerful and surpasses the attraction between the article-attracting magnet piece and the article.

Therefore, it is possible to improve reliability required in the transfer of articles by powerful magnetic attraction which displaces the article-attracting magnet piece from the chain outer circumferential side to the chain inner circumferential side within the magnet-piece-accommodating chamber when the articles are conveyed between the preceding straight conveying area to the terminal discharge area.

According to the fifth aspect of the chain conveyor system of the invention, the article-separating means comprises a separate auxiliary conveyor disposed adjacent the main conveyor's inner circumferential surface in the main conveyor's longitudinal direction between the terminal discharge area and the straight conveying area, There auiliary conveyor has a pair of article-separating sprockets and an article-separating chain wrapped around the pair of article-separating sprockets, Article-separating magnet pieces are provided in the links of the article-separating chain. The article-separating magnet pieces release the attraction between the article-attracting magnet pieces and the articles when the article-separating magnet pieces register with the article-attracting magnet pieces.

Therefore, it is possible to reliably transfer the articles to the succeeding conveyor line and others without unintentionally continuing to attract the articles in the terminal discharge area of the conveyor chain, even if the articles are elongated in the direction in which the articles advance.

According to the sixth aspect of the chain conveyor system of the invention, because one article-separating sprocket among the pair of article-separating sprockets is supported rotably on the rotary shaft coaxial with the sprocket that turns the conveyor chain through the intermediary of the bearing, the article-attracting magnet pieces and the article-separating magnet pieces attract each other when they register with one another.

Therefore, it is possible to securely separate the articles while interlinking with the movement of the conveyor chain without driving the article-separating sprocket from the outside.

According to the seventh aspect of the chain conveyor system of the invention, because one article-separating sprocket among the pair of article-separating sprockets is fixed to the rotary shaft of the sprocket that turns the conveyor chain through a key that fits into a key groove formed on the rotary shaft, the article-separating sprockets rotate without any delay relative to the sprocket that turns the conveyor chain and rotates the article-separating auxiliary conveyor chain in synchronism with the main conveyor chain.

Therefore, it is possible to securely transfer the articles to the succeeding conveyor line and the like by keeping a distance between the article-attracting magnet piece and the article-separating magnet piece constant in the terminal discharge area of the conveyor chain and by using the article-separating magnet piece to securely separate the article-attracting magnet piece from the article.

According to the eighth aspect of the chain conveyor system of the invention, because the article-attracting magnet pieces and the article-separating magnet pieces are elongated in the conveyor width direction within the conveyor chain, the article-attracting magnet pieces within the synthetic resin link modules move all together in the conveyor width direction between the chain outer circumferential side where the magnet pieces attract the articles and the inner circumferential side within the magnet-accommodating chambers where the magnet pieces attract the article-separating magnet pieces and forcibly either attract or separate the articles corresponding to the engagement and disengagement states of the conveyor chain and the sprocket.

Therefore, the chain conveyor system can smoothly transfer out the articles to the succeeding conveyor line and others in the terminal discharge area of the conveyor chain without unintentionally biasing loading orientation of the articles, i.e., can realize a so-called steady transfer while keeping a loading attitude.

PREFERRED EMBODIMENTS OF THE INVENTION

[First Embodiment]

Figure 1:
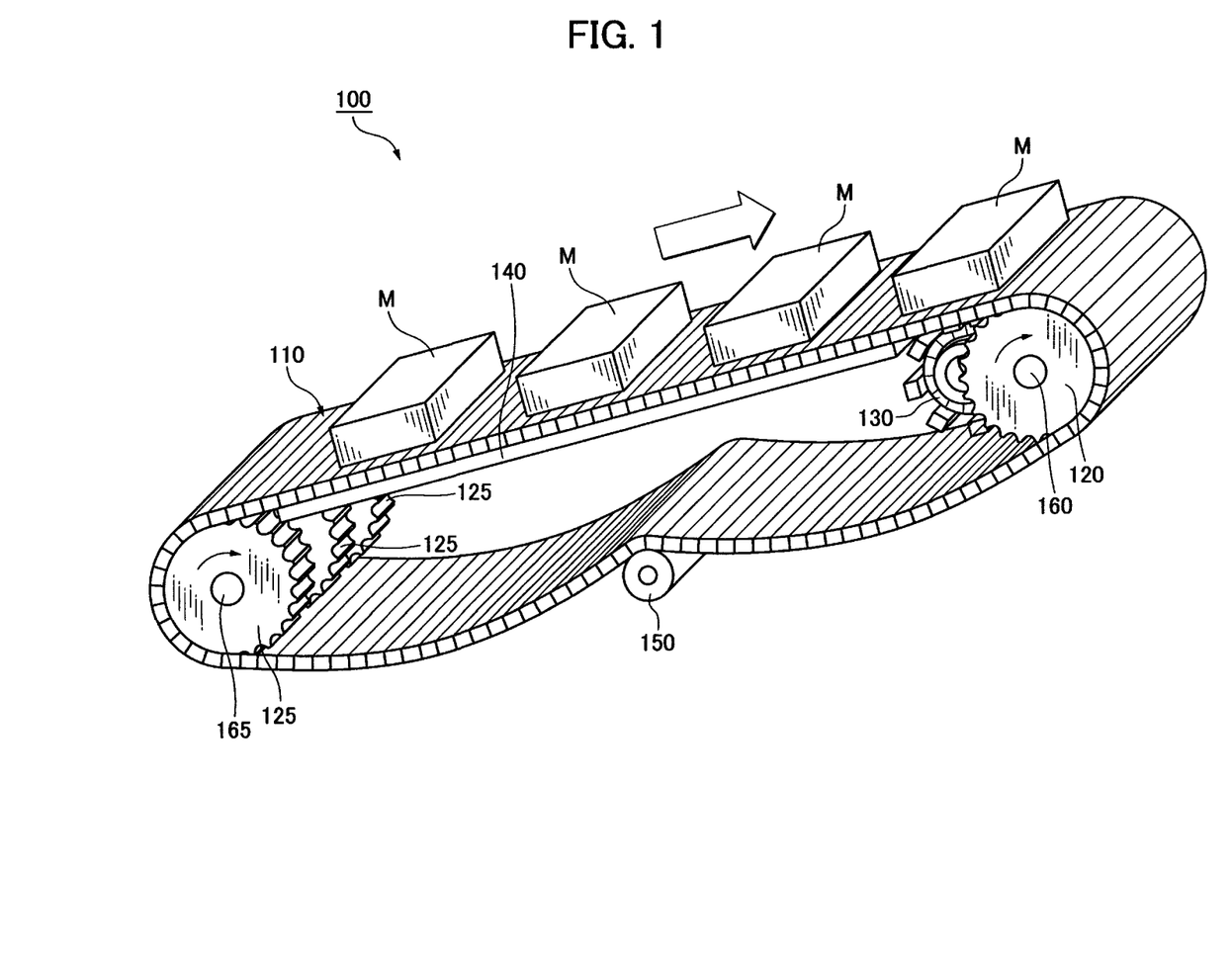
FIG. 1 is a general view showing a mode of use of a chain conveyor system of one embodiment of the invention.

A first embodiment of a chain conveyor system of the invention will be explained with reference to FIGS. 1 through 6B. As shown in FIG. 1, the chain conveyor system 100 of the first embodiment of the invention comprises a conveyor chain 110 and sprockets 120 that engage with and turn the conveyor chain 110. The conveyor chain 110 comprises a large number of synthetic resin link modules 111 and link pins 112 for linking the link modules with each other in a chain longitudinal direction and conveys metallic magnetic articles M by attracting and retaining the articles on conveying surfaces 111a thereof by magnetism in a conveyor line inclined upward.

Thus, the chain conveyor system 100 conveys the metallic magnetic articles M by securely attracting and retaining the articles while avoiding damages and vibration noise otherwise generated by impacts between the articles M and the synthetic resin link modules 111 of the conveyor chain 110 that synergistically exhibit attractive and impact absorbing forces and absorb impacts and vibrations of the articles M that are otherwise liable to be generated during conveyance of the articles.

FIG. 1 also shows an article-separating means in the form of an auxiliary conveyor 130 for separating the articles M attracted by the synthetic resin link modules 111 described later, a guide rail 140 for restricting and guiding the conveyance and travel of the conveying run of the chain 110, an intermediate idler 150 for supporting the conveyor chain 110 to limit slacking of the return run of the chain. The chain spans between sprockets 120 and 125 which are mounted on rotary shafts 160 and 165. The shaft 160 not only mounts the sprockets 120 but also supports the article-separating auxiliary conveyor 130.

Figure 2:
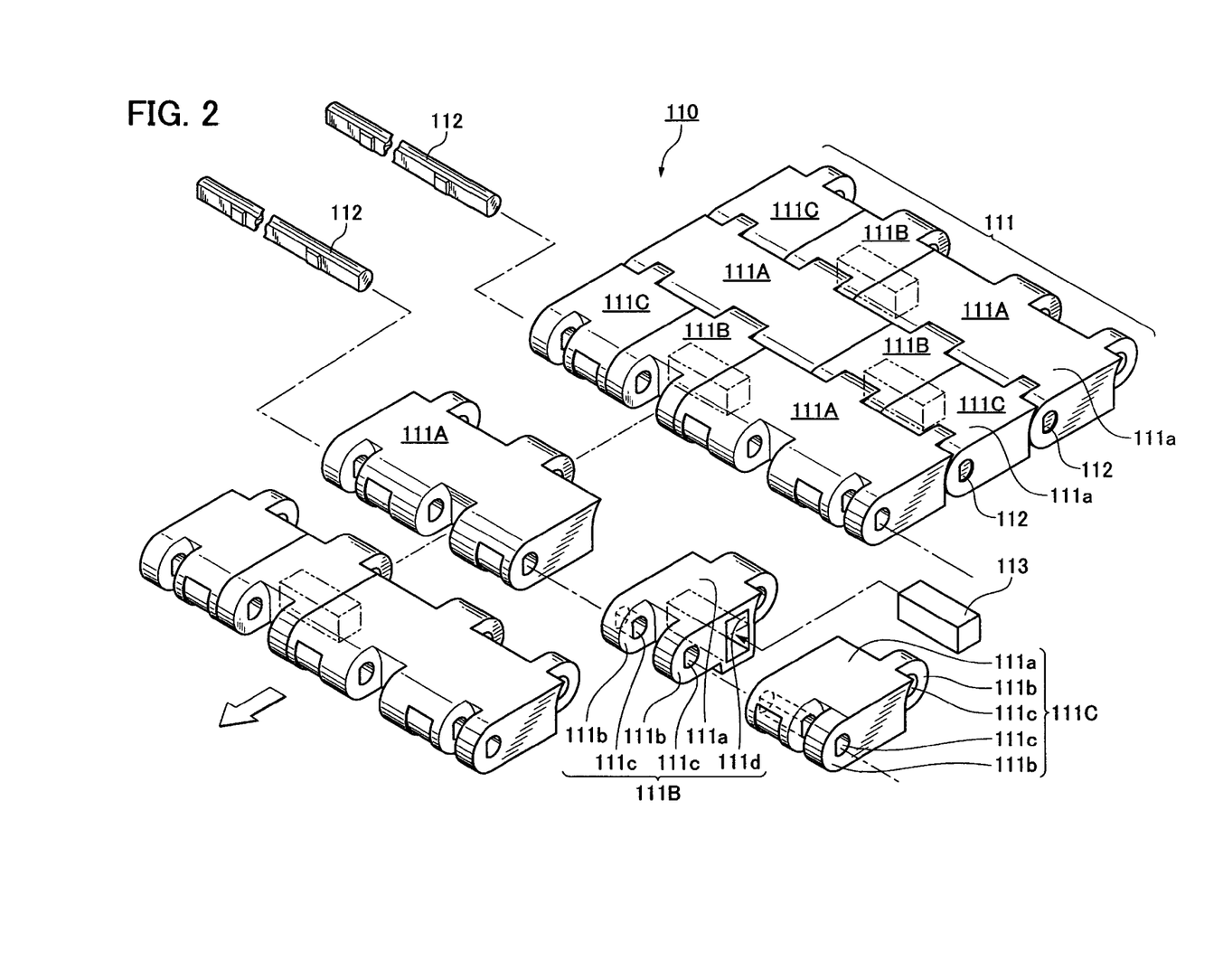
FIG. 2 is an assembly and exploded view of a conveyor chain of the chain conveyor system shown in FIG. 1.
Figure 3:
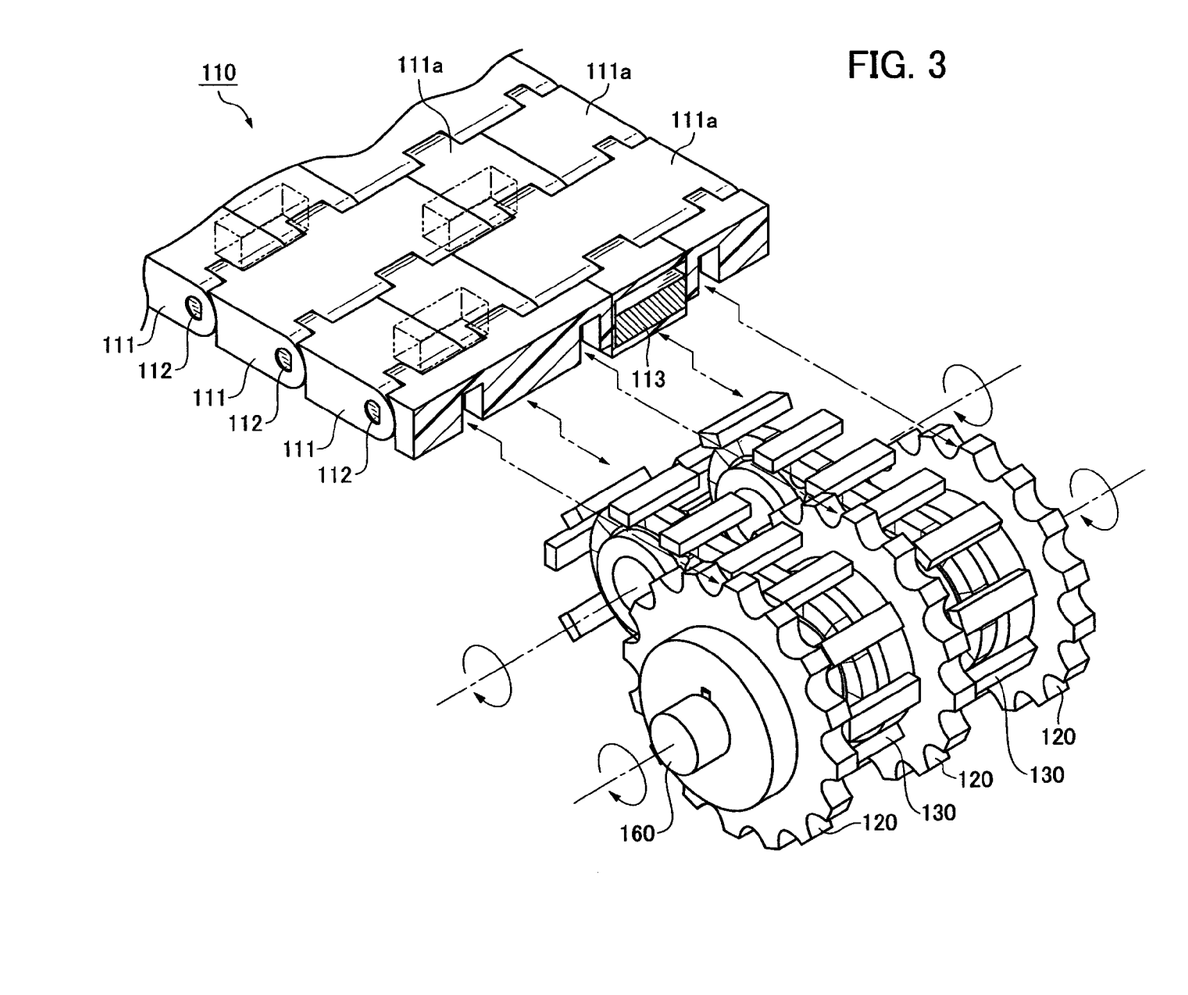
FIG. 3 is a perspective view showing how the conveyor chain and a sprocket shown in FIG. 1 are disposed.

As shown in FIGS. 2 and 3, each synthetic resin link module 111 has a conveying surface 111a for loading the articles M, hinge portions 111b respectively projecting before and after the conveying surface 111a and pin inserting holes 111c formed through the respective hinge portions 111b. The conveyor chain 110 described above is constructed into a predetermined array pattern by linking three of the synthetic resin link modules 111 in a conveyor width direction and the large number of three synthetic resin link modules 111 are linked in a chain longitudinal direction by inserting the link pins 112 through the pin inserting holes 111c.

In the illustrated embodiment, there are three synthetic resin link modules 111A, 111B and 111C arrayed across the width of the conveying run of the chain 110 in a defined pattern. In hgis pattern, the synthetic resin link modules 111A have a module width a little wider than twice the width of the synthetic resin link modules 111B and 111C. The synthetic resin link modules 111B and 111C have the equal module width. In the illustrated pattern, the position of the synthetic resin link modules 111A and 111C is reversed bilaterally and sequentially in the chain longitudinal direction one after another. In each row of the pattern, the module 11B is positioned between the modules 111a and 111C.

Figure 6A:
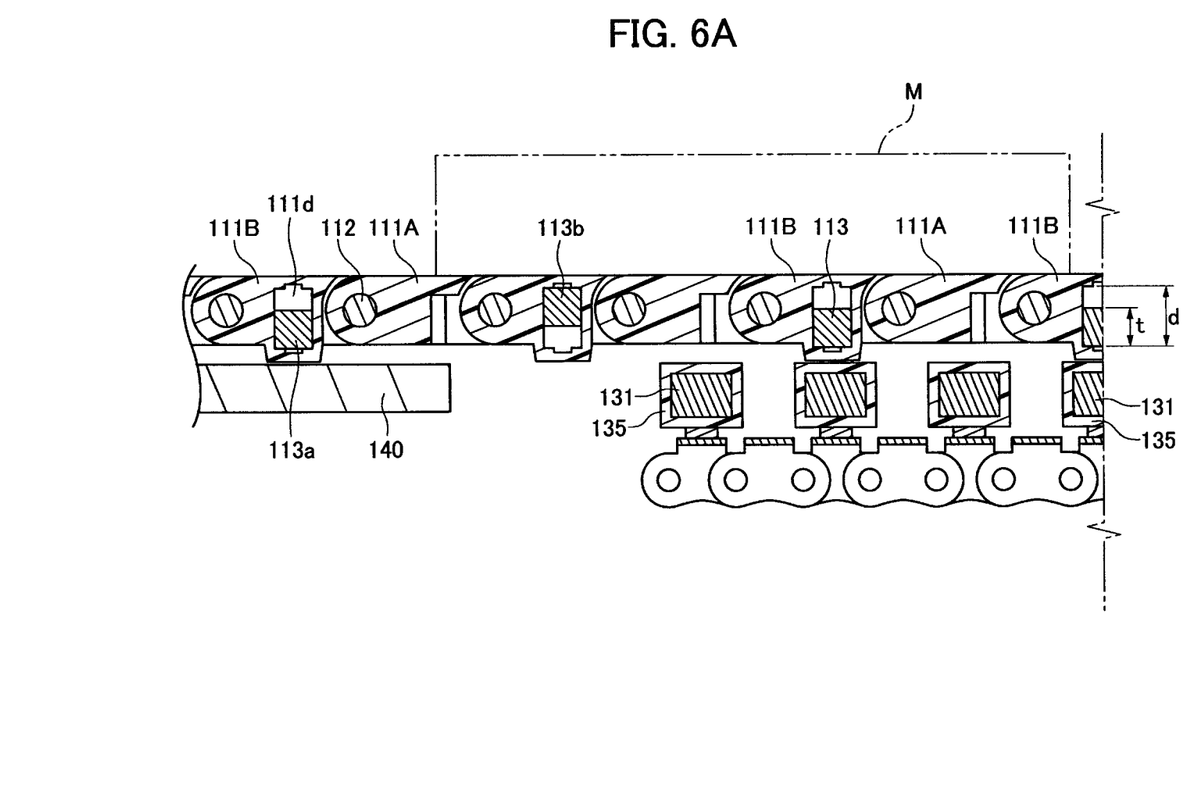
FIG. 6A is an enlarged fragmentary view of the components to the left of the line 6-6 in FIG. 5.

Each synthetic resin link module 111B described above has a magnet-piece-accommodating chamber 111d formed therein and the magnet-piece-accommodating chamber 111d has an article-attracting magnet piece 113 that attracts and retains the article M on the conveying surface 111a by moving from a chain inner circumferential side to a chain outer circumferential side within the magnet-piece-accommodating chamber. As shown in FIG. 6A, the piece 113 has a thickness t which is less the depth d of the chamber 111d. This enables the piece 113 to move from its rest position at the bottom of the chamber 111d, shown at 113a in FIG. 6A to the top of the chamber 111d when an article M is positioned atop the piece, as shown at 113b When the piece 113 passes into registry with the article-separating piece 131, the superior magnetic force of the piece 131 displaces the piece 113 to the bottom of the chamber as shown at 113c in FIG. 6A, and enables the article M to be discharged or transferred from the conveyor run.

Thus, the conveyor chain 110 used in the present embodiment carries the articles M by disposing the synthetic resin link modules 111B having the article-attracting magnet pieces 113 in zigzag in the chain longitudinal direction.

Figure 4:
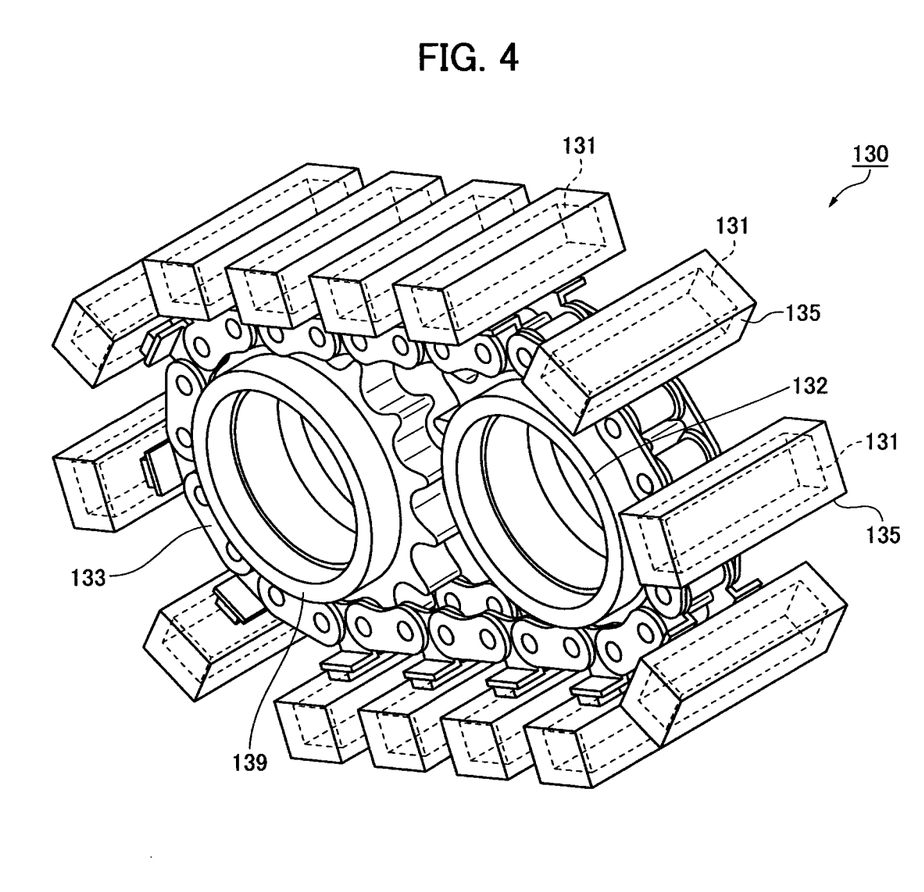
FIG. 4 is a perspective view of an article-separating means shown in FIG. 3.
Figure 5:
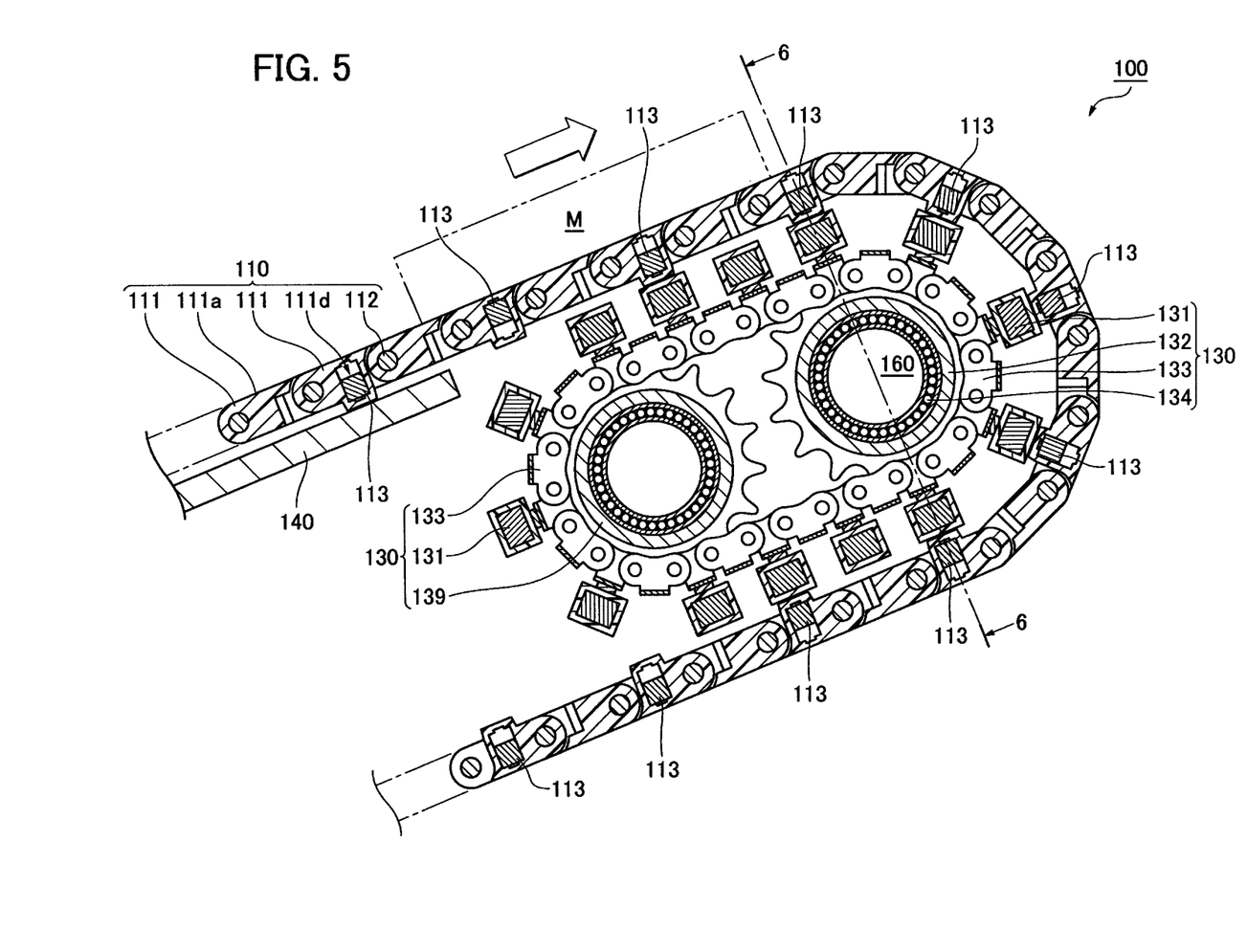
FIG. 5 is an explanatory view explaining operations of the chain conveyor system shown in FIG. 1.

As shown in FIGS. 3-5, two article-separating auxiliary conveyors 130 for separating the articles M attracted by the synthetic resin link modules 111B described above includes a chain 133 which spans between sprockets 132 and 164 extend from the shaft 160 past the terminal discharge area of the main conveying run of the chain 110 to a preceding straight discharge area of the conveying run of the chain 110, and are disposed coaxially with the rotary shafts 160 fitted and fixed to the sprockets 120 that engage with and turn the conveyor chain 110.

As shown in FIGS. 4 and 5, the article-separating means 130 comprises article-separating magnet pieces 131 that attract the article-attracting magnet pieces 113 within the magnet-piece-accommodating chambers 111d. As shown in FIG. 6A, the magnet piece 131 has a thickness t which is less then the depth d of the chamber 111d, which enables the magnet piece 131 to move between the outer circumferential surface and the inner circumferential surface of the chain within the magnet-piece-accommodating chambers 111d.

With this arrangement, the article-attracting magnet piece 113 provided within the synthetic resin link module 111B is permitted to forcibly attract or separate the article M by moving between the chain outer circumferential side within the magnet-piece-accommodating chamber 111d. In the outer position, the magnet piece 113 attracts the metallic magnetic article M. In the inner position at the chain inner circumferential side within the magnet-piece-accommodating chamber 111d, the magnet piece 113 is attracted to the article-separating magnet piece 131, and the magnetic attraction to the article M is reduced to permit separating of the article corresponding from the conveying surface for discharge or transfer.

It is noted that as shown in FIGS. 4, 5 and 6A, the article-separating magnet piece 131 is enclosed by synthetic resin sheath 135 to prevent it from directly contacting the conveyor chain 110 in the terminal discharge area and the preceding straight discharge area of the conveyor chain 110 where the auxiliary conveyor chain 130 underlies the conveying run. This prevents the article-separating magnet piece 130 being chipped or flying apart.

As shown in FIG. 4, the auxiliary conveyor 130 comprises a pair of article-separating sprockets 132 and 139 separately disposed along the chain longitudinal direction between the terminal discharge area and the straight conveying area on the chain inner circumferential surface and a roller chain 133 as an article-separating chain spanning between the pair of article-separating sprockets 132 and 139. The article-separating magnet pieces 131 are provided in the article-separating chain.

With this arrangement, the article-separating magnet pieces 131 overcome the attraction of the article-attracting magnet pieces 113 to the articles M between the pair of article-separating sprockets 132 and 139 disposed separately along the chain longitudinal direction and securely enable transfer of the articles M to a succeeding conveyor line and the like without unintentionally continuing to attract the articles M in the terminal discharge area of the conveyor chain 110 even if the articles M are elongated in the direction of travel of the conveying run.

The article-separating sprockets 132 are mounted on the shaft 160 in the terminal discharge area of the conveyor chain 110, and are interleaved with the article-separating sprockets 132 which are rotably supported on the rotary shaft 160 through a bearing 134 coaxially disposed with the rotary shaft 160 as shown in FIG. 5.

The other article-separating sprocket 139 provided below the preceding straight discharge area of the conveyor chain 110 is supported on a rotary shaft (not shown in FIG. 5) and provided in parallel with the rotary shaft 160 rotably through a bearing.

Figure 6B:
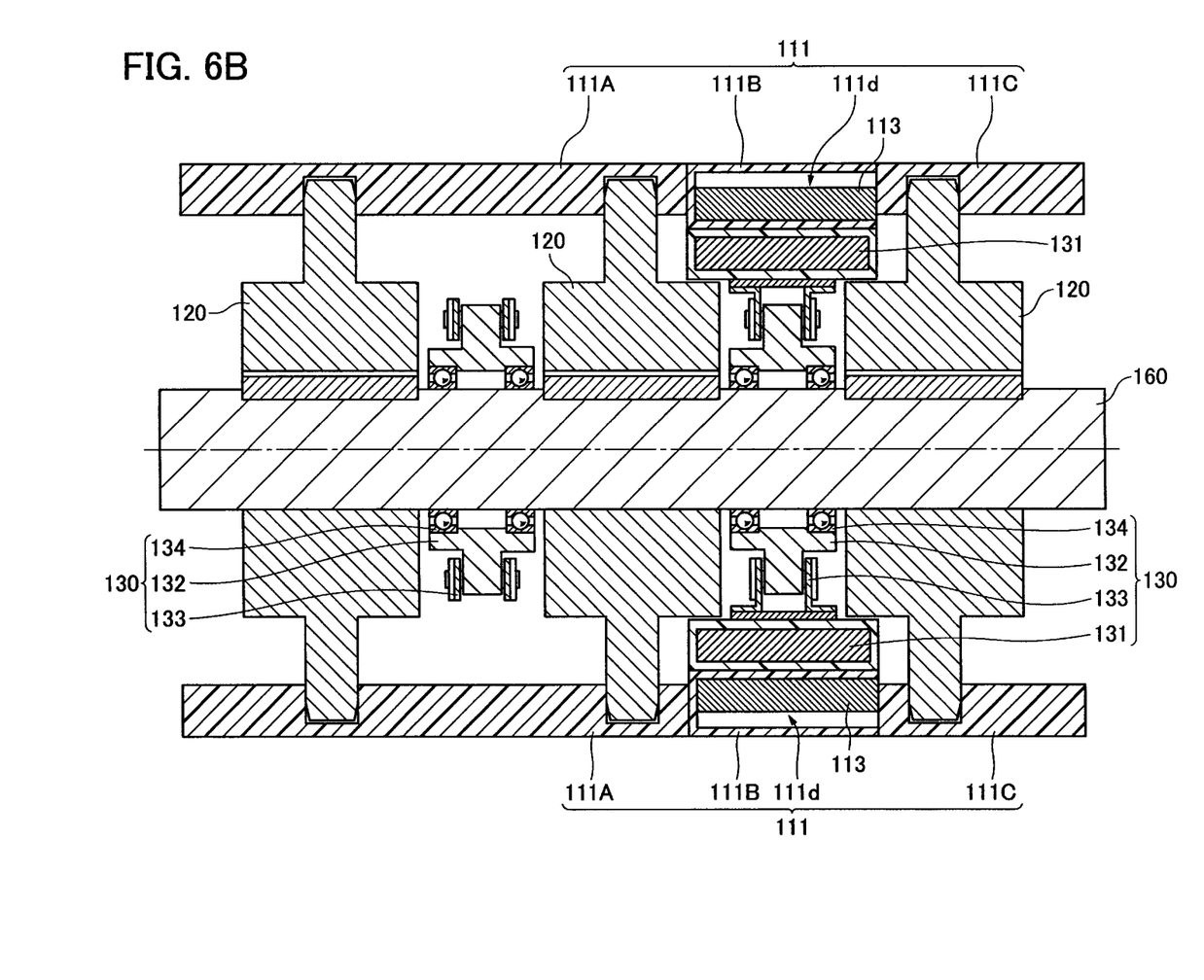
FIG. 6B is a section view taken along the line 6-6 in FIG. 5 to explain the operations of the chain conveyor system.

In operation, as shown in FIGS. 5, 6A and 6B, the article-separating magnet pieces 131 of the article-separating auxiliary conveyor 130 register with and attract the article-attracting magnet pieces 113 of the synthetic resin link modules 111B to the bottom of the chamber 111d, reducing or overcoming the magnetic attraction between the piece 113 and the article M, thereby enabling separation of the article from the conveying surface for discharge or transfer. When the pieces 131 register with the pieces 113, the magnetic attraction between the pieces moves the auxiliary conveyor chain 113 without driving the article-separating sprockets 132 and 139 from the outside.

The article-separating magnet pieces 131 of the article-separating means 130 described above are disposed respectively so as to register with the article-attracting magnet pieces 113 of the synthetic resin link modules 111B as shown in FIGS. 5, 6A and 6B, and the article-separating magnet pieces 131 of the article-separating means 130 and the article-attracting magnet pieces 113 of the synthetic resin link modules 111B attract with each other.

The attractive force of the article-separating magnet piece 131 to the article-attracting magnet piece 113 is set to be greater than the attractive force of the article-attracting magnet piece 113 to the article M., and the article-attracting magnet pieces 113 are powerfully attracted away from the chain outer circumferential side to the chain inner circumferential side within the magnet-piece-accommodating chambers 111d when the articles are conveyed from the preceding straight discharge area to the terminal discharge area.

As shown in FIGS. 2, the article-attracting magnet pieces 113 and the article-separating magnet pieces 131 are elongated in the conveyor width direction within the conveyor chain 110.

With this arrangement, the article-attracting magnet pieces 113 within the synthetic resin link modules 111 move all together on both sides in the conveyor width direction between the chain outer circumferential side within the magnet-piece-accommodating chamber 111d where the magnet piece attracts the metallic article and the inner circumferential side within the magnet-accommodating chambers 111d where the magnet piece attract with the article-separating magnet piece 131 and forcibly attract or separate the articles M corresponding to the engagement and disengagement states of the conveyor chain 110 and the sprocket 120.

Because the chain conveyor system 100 of the present embodiment thus obtained has the conveyor chain 110 that is assembled by linking the large number of synthetic resin link modules 111 that attract and retain the articles M on the conveying surfaces 111a by the magnetism with each other in the chain longitudinal direction by the link pins 112 and the sprocket 120 that engages with and turn the conveyor chain 110, the chain conveyor system 100 can convey the articles M while securely attracting and retaining the articles M in the conveyor line inclined upward and can avoid the damage and vibration noise otherwise generated by the impacts of the metallic magnetic articles M.

Still more, because the synthetic resin link modules 111B between the modules 111A and 111C of the conveyor chain 110 have the article-attracting magnet pieces 113 that move from the chain inner circumferential side to the chain outer circumferential side within the magnet-piece-accommodating chambers 111d to attract and retain the articles M on the conveying surfaces 113 and because the article-separating auxiliary conveyor 130 for separating the articles M attracted to the synthetic resin link modules 111B has the bearing 134 coaxially disposed with the sprocket 120, the article-separating sprocket 132 axially supported through the bearing 134 and the article-separating magnet pieces 131 disposed on the outer circumferential parts of the article-separating sprocket 132 to separate the articles M by attracting the article-attracting magnet pieces 113 in the synthetic resin link modules 111B from the chain outer circumferential side to the chain inner circumferential side within the magnet-piece-accommodating chambers 111d, the chain conveyor system 100 can smoothly convey out the metallic magnetic articles M to the succeeding conveyor line and others in the conveyor terminal discharge area in which the sprockets 120 coaxially having the article-separating means 130 are disposed without unintentionally continuing to attract the articles M, i.e., can realize a so-called steady transfer.

Still more, it is possible to securely avoid the articles M from being unintentionally attracted in the terminal discharge area by enlarging the range where the article-attracting magnet pieces 113 are forcibly separated from the articles M as necessary to separate the articles M, as compared to the case when the article-separating means 130 is provided coaxially with the sprocket 120, i.e., when the article-separating means 130 is provided only in the terminal discharge area of the conveyor chain 110.

Furthermore, because the article-separating magnet pieces 131 of the article-separating means 130 are disposed so as to face respectively to the article-attracting magnet pieces 113 of the synthetic resin link modules 111 and the attractive force of the article-separating magnet pieces 131 is set to be greater than the attractive force of the article-attracting magnet pieces 113 to the articles M, it becomes possible to achieve the smooth transfer by exhibiting the both attractive forces in maximum and steadily in separating the articles without causing any phase shift in the separation timing of the article-separating means 130. It is also possible to improve the reliability required in the tranferring work by powerfully attracting the article-attracting magnet piece 113 within the synthetic resin link module 111B from the chain outer circumferential side to the chain inner circumferential side within the magnet-piece-accommodating chamber 111d to release the attraction with the article M instantly. Thus, the advantageous effects of the invention are remarkable.

[Second Embodiment]

Next, a second embodiment of a chain conveyor system of the invention will be explained with reference to FIGS. 7 and 8.

Figure 7:
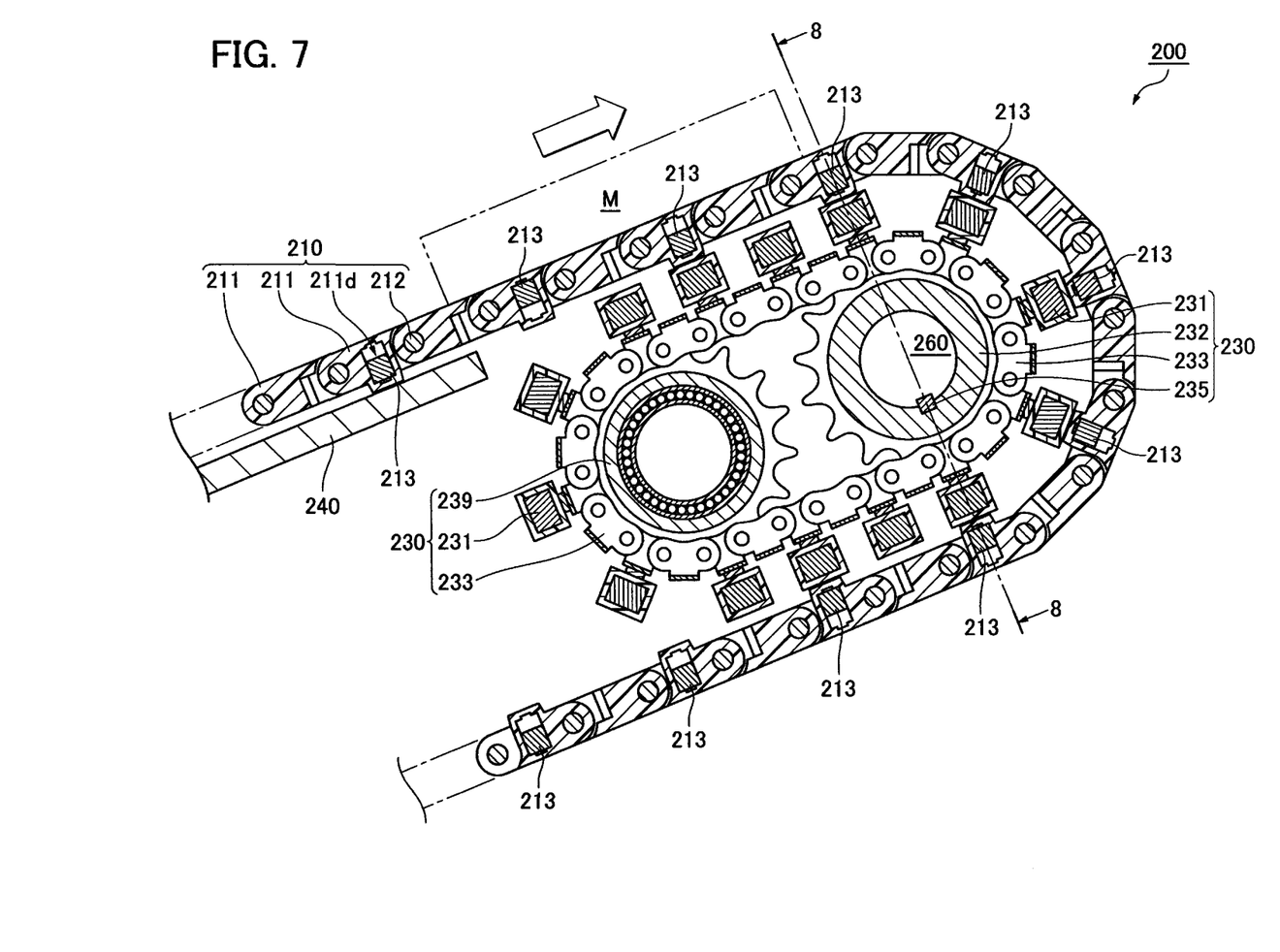
FIG. 7 is an explanatory view explaining operations of a chain conveyor system of a second embodiment of the invention.
Figure 8:
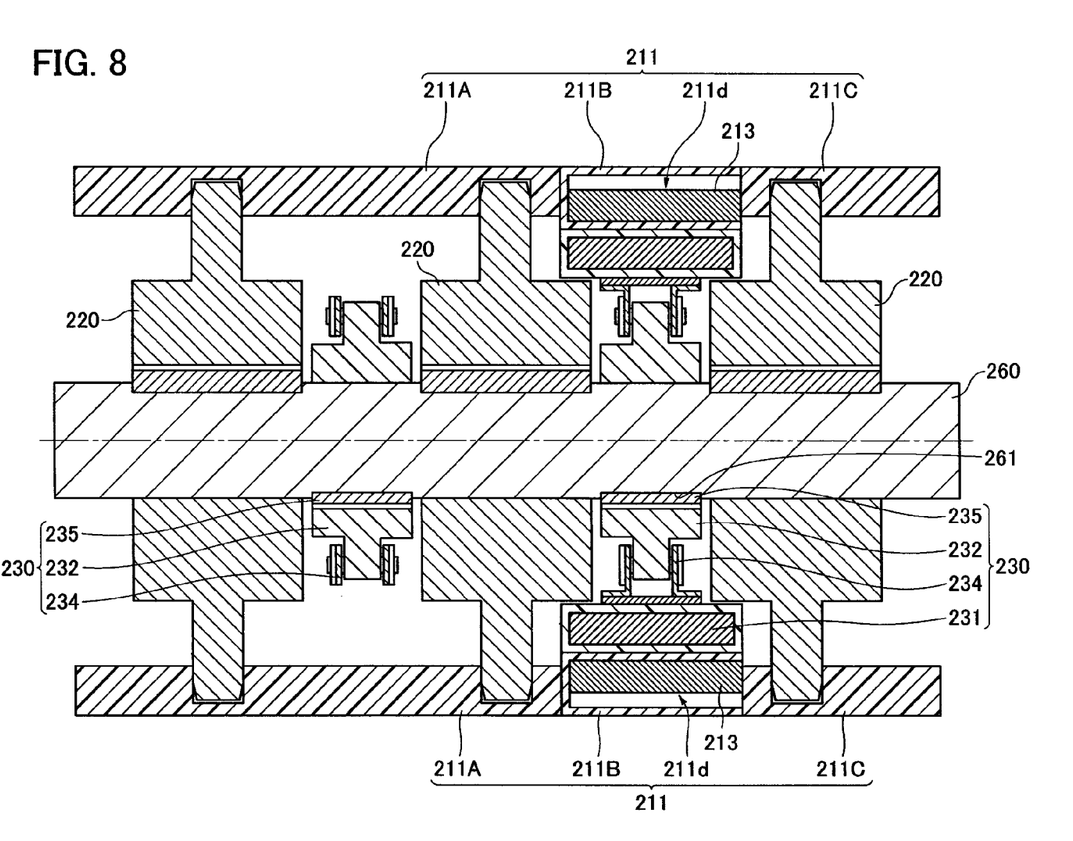
FIG. 8 is a section view taken along a line 8-8 FIG. 7 to explain the operations of the chain conveyor system.

As compared to the chain conveyor system 100 of the first embodiment described above, the chain conveyor system of the second embodiment is different only in terms of the configuration of the article-separating auxiliary conveyor, and is not different basically in terms of the configuration of the other parts as shown in FIG. 7. Therefore, the same or corresponding parts of the second embodiment with those of the chain conveyor system 100 of the first embodiment will be denoted by reference numerals in 200 and a duplicate explanation thereof will be omitted here.

As shown in FIG. 7, article-separating auxiliary conveyor 230 of the chain conveyor system 200 of the present embodiment extends from the terminal discharge area to the preceding straight discharge area of the main conveyor chain 210. Two sets of the article-separating means are disposed coaxially with the sprocket 220 as shown in FIG. 8.

The article-separating auxiliary conveyor 230 comprises a pair of article-separating sprockets 232 and 239 disposed adjacent the inner circumferential surface of the chain 210 and space-apart in the chain longitudinal direction between the terminal discharge area and the preceding straight discharge area. A roller chain 233 comprising an article-separating chain is wrapped around the pair of article-separating sprockets 232 and 239. The chain 233 has links in which article-separating magnet pieces 231 are provided.

As shown in FIG. 7, the article-separating sprockets 232 is positioned at the terminal discharge area of the conveyor chain 210 and is interleaved with the sprockets 220 for the main conveyor chain 210. In this embodiment of the invention, the article-separating sprocket 232 is fixed to the rotary shaft 260 through a key 235 that fits with a key groove 261 formed on the rotary shaft 260. In this embodiment of the invention, the sprockets 220 engage with and turns the main conveyor chain 210 and are fixed to the rotary shaft 260.

The auxiliary conveyor sprocket 239 provided at the start of the preceding straight discharge area of the conveyor chain 210 is rotably supported by a rotary shaft (not shown) provided in parallel with the rotary shaft 260 through a bearing.

The chain conveyor system 200 of the present embodiment thus obtained brings about not only the same effects with those of the chain conveyor system 100 of the first embodiment described above but also securely transfers the articles M to the succeeding conveyor line and the like. That is, the article-separating sprocket 232 rotates the roller chain 233 in synchronization with the conveyor chain 210 without permitting retardation of the sprocket 220 that drives the conveyor chain 210, so that a distance between the article-attracting magnet piece 213 and the article-separating magnet piece 231 is kept constant and the article-separating magnet piece 231 securely separates the article M from the article-attracting magnet piece 213. Thus, the advantageous effect of the present embodiment is remarkable.

The specific embodiment of the chain conveyor system of the present invention may take any form as long as it has the features defined in the following claims.

As for the specific mode of use of the chain conveyor system of the invention, while it is suitably used in the conveyor lines inclined upward or downward where it is required to securely attract and retain the metallic magnetic articles and the slippery and wet conveyor lines where lubricant such as soap water is spread, it is needless to say that it is applicable also to conveyor lines where articles are conveyed horizontally.

The article-separating means provided within the chain conveyor system of the invention may be disposed specifically at any parts of loading area, discharge area or intermediate parts between them of the conveyor chain and may extend from the terminal discharge area to the preceding straight discharge area or may extend to an inclined straight conveying area.

When the article-separating means is disposed on the inner circumferential surface of the chain and extends in the inclined straight conveying area in particular, the article-separating magnet pieces attract the article-attracting magnet pieces within the magnet-piece-accommodating chambers from the outer circumferential surface to the inner circumferential surface of the chain and release the attraction between the articles and the article-attracting magnet pieces, allowing the articles to be readily sampled out, across the range in which the article-separating means extends even when the article-attracting magnet pieces exert the strong attractive force on the articles. Therefore, it is possible to reduce the work in sampling the articles in the straight conveying area.

The conveyor chain used in the chain conveyor system of the invention may have any configuration as long as it comprises the large number of synthetic resin link modules each having the conveying surface and the link pins for linking the synthetic resin link modules with each other in the chain longitudinal direction and conveys the metallic magnetic articles by attracting and retaining the articles on the conveying surfaces thereof by magnetism.

For instance, the conveyor chain may be either one in which the large number of synthetic resin link modules, each having the conveying surface for loading the metallic magnetic article-and the hinge portions projecting before and after the conveying surface, are linked in the chain longitudinal direction through the link pins inserted through the pin inserting holes formed in the hinge portions, or one in which the large number of link rows, each comprising the synthetic resin link modules disposed in the conveyor width direction and each having the conveying surface and the hinge portions before and after the conveying surface, is linked in the chain longitudinal direction in a predetermined array pattern through the link pins inserted through the pin inserting holes formed through the hinge portions.

A specific material of the synthetic resin link module used in the conveyor chain described above may be any material as long as it is synthetic resin that absorbs the impact and vibrations of the metallic magnetic articles and has favorable mechanical properties and molding precision. For instance, any one of polyolefin resin such as polyethylene and polypropylene, polyamide resin, polyester resin, polyacrylic resin, polyacetal resin, polyvinyl chloride resin and polystyrene resin may be used.

The specific configuration of the magnet-piece-accommodating chamber formed within the synthetic resin link module described above may be any magnet-accommodating space as long as it allows the article-attracting magnet piece for attracting and retaining the articles on the conveying surfaces to move from the chain inner circumferential side to the chain outer circumferential side or to be attracted from the chain outer circumferential side to the chain inner circumferential side within this magnet-piece-accommodating space.

When the magnet-piece-accommodating chamber is a magnet-accommodating space which allows the article-attracting magnet pieces to extend in the conveyor width direction of the conveyor chain, it becomes possible to forcibly attract and separate the articles all together on both sides of the conveyor width direction.

A concrete material of the article-separating magnet piece of the article-separating means and the article-attracting magnet piece of the synthetic resin link module used in the chain conveyor system of the invention may be any permanent magnet such as rare-earth magnet and ferrite magnet as long as it is capable of assuring magnetic force required for attracting and retaining the metallic magnetic articles. Neodymium magnet whose residual magnetic flux density and attractive force are strong and which is weak in temperature change is also adoptable.

A concrete configuration of the article-attracting magnet piece described above may be formed into any configuration such as a rectangular parallelepiped, a bar and a plate as long as it has a thickness relative to the depth of the chamber which permits it to be moved from the chain inner circumferential side to the chain outer circumferential side or attracted from the chain outer circumferential side to the chain inner circumferential side within the magnet-piece-accommodating chamber.

It is preferable to set the attractive force of the article-separating magnet piece to the article-attracting magnet piece described above to be greater than the attractive force of the article-attracting magnet piece to the articles. In this case, the attraction between the article-separating magnet piece and the article-attracting magnet piece becomes superior to the attraction between the article-attracting magnet piece and the article and it becomes possible to improve reliability in the tranferring work by powerfully attracting the article-attracting magnet piece within the synthetic resin link module from the chain outer circumferential side to the chain inner circumferential side within the magnet-piece-accommodating chamber to release the attraction with the article instantly.

It is needless to say that the article-separating magnet pieces of the article-separating means and the article-attracting magnet pieces of the synthetic resin link modules used in the chain conveyor system of the invention are disposed so that the south and north poles thereof face with each other.

The article-separating chain of the article-separating auxiliary conveyor may have any configuration as long as the chain is wrapped around the pair of article-separating sprockets and around which the article-separating magnet pieces are provided. The chain may be a bush chain or a roller chain.

What is claimed is:

1. A chain conveyor system comprising:
a main conveyor chain having a plurality of synthetic resin link modules interconnected to provide a conveying run extending from a feed end to a discharge end, said modules having upper conveying surfaces forming said conveying run, said conveying run operable to convey articles from the feed end to a discharge end by attracting and retaining the articles on the conveying surfaces thereof by magnetic attraction;
an article-separating auxiliary conveyor having links registering with the underside of said conveying link modules to enable separation of the articles on said upper conveying surface attracted to said synthetic resin link modules;
said link modules of the main conveyor further comprising magnet-piece-accommodating chambers having a given depth within said synthetic resin link modules; and
article-attracting magnet pieces accommodated within the magnet-piece-accommodating chambers, said pieces having a thickness less than said given depth to enable said pieces to move from a chain inner circumferential side to a chain outer circumferential side within said magnet-piece-accommodating chambers to attract and retain an article on the conveyor surface, and
said auxiliary conveyor comprising links registering with the link modules of the main conveyor, said links having article-separating magnet pieces that attract the article-attracting magnet pieces within the magnet-piece-accommodating chambers, to displace said pieces from the outer end of said chamber to the inner end of said chamber to reduce the reduce the magnetic attraction upon with the articles on the conveyor.

2. The chain conveyor system according to claim 1, wherein said main conveyor has a main sprocket terminating the conveying run, and said auxiliary conveyor has an auxiliary sprocket concentric with said main sprocket, and said system has a common rotary shaft driving said sprockets, the links of said auxiliary conveyor underlying the link modules of said main conveyor at the end of said conveying run.

3. The chain conveyor system according to claim 1, wherein the article-separating magnet pieces of said auxiliary conveyor are disposed respectively so as to register with chambers housing the article-attracting magnet pieces of said resin link modules.

4. The chain conveyor system according to claim 1, wherein said article-separating magnet piece has an attractive force to said article-attracting magnet piece greater than an attractive force of said article-attracting magnet piece to the article.

5. The chain conveyor system according to claim 2, wherein said auxiliary conveyor comprises a pair of auxiliary sprockets disposed adjacent the inner circumferential surface of said conveying run to cause the links of the auxiliary conveyor to register with the link modules of the main conveyor in at a discharge point of the conveying run.

6. The chain conveyor system according to claim 5, wherein one of said pair of auxiliary sprockets is rotatably supported on said common shaft through an intermediary bearing.

7. The chain conveyor system according to claim 5, wherein one of the pair of auxiliary sprockets is fixed to said common shaft.

8. The chain conveyor system according to claim 1, wherein said article-attracting magnet pieces have lengths greater than their widths, and their lengths extend in the width direction of said conveying run.

9. The chain conveyor system according to claim 1, wherein article-separating magnets are enclosed in a sheath of non-magnetic material.

10. A chain conveyor system comprising:
   a conveyor chain having a plurality of synthetic resin link modules interconnected to provide a conveying run extending from a feed end to a discharge point, said modules having upper conveying surfaces forming said conveying run, said conveying run operable to convey articles from the feed end to a discharge end by attracting and retaining the articles on the conveying surfaces thereof by magnetic attraction;
   an article-separating auxiliary device at said discharge point having a separation-enabling magnet piece registering with the underside of said conveying link modules to enable separation of the articles on said upper conveying surface attracted to said synthetic resin link modules;
   said link modules of the main conveyor further comprising magnet-piece-accommodating chambers having a given depth within said synthetic resin link modules; and
   article-attracting magnet pieces accommodated within the magnet-piece-accommodating chambers, said pieces having a thickness less than said given depth to enable said pieces to move from a chain inner circumferential side to a chain outer circumferential side within said magnet-piece-accommodating chambers to attract and retain an article on the conveyor surface, and
   said article-separating magnet pieces at said discharge point being positioned to register with the article-attracting magnet pieces within the magnet-piece-accommodating chambers, to displace said pieces from the outer end of said chamber to the inner end of said chamber to reduce the reduce the magnetic attraction upon with the articles on the conveyor.

11. The chain conveyor system according to claim 10, wherein said article-separating magnet piece at said discharge point has a magnetic force upon said article-attracting magnet piece within said chamber which is greater than the magnetic force of said article-attracting magnet upon the article on the conveyor at said discharge point, the top of said thereby causing said article-attracting magnet to move from the top of its magnet-piece-accommodating chamber to the bottom of said chamber.

* * * * *